United States Patent
Stauber

(10) Patent No.: US 8,573,378 B2
(45) Date of Patent: Nov. 5, 2013

(54) PARKING LOCK DEVICE FOR MOTOR VEHICLE

(75) Inventor: Juergen Stauber, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 427 days.

(21) Appl. No.: 12/967,393

(22) Filed: Dec. 14, 2010

(65) Prior Publication Data

US 2011/0168519 A1 Jul. 14, 2011

(30) Foreign Application Priority Data

Jan. 11, 2010 (DE) .................. 10 2010 000 774

(51) Int. Cl.
*F16H 63/34* (2006.01)
*F16H 63/38* (2006.01)
*B60T 1/06* (2006.01)

(52) U.S. Cl.
USPC ............. 192/219.5; 188/31; 188/265; 74/527

(58) Field of Classification Search
USPC ............................................ 192/219.4, 219.5
See application file for complete search history.

(56) References Cited

U.S. PATENT DOCUMENTS

| 6,279,713 B1 * | 8/2001 | Young et al. ................ 192/219.5 |
| 7,182,195 B2 * | 2/2007 | Eschenbeck et al. ....... 192/219.5 |
| 7,757,832 B2 * | 7/2010 | Sauter et al. ................ 192/219.5 |
| 2007/0283735 A1 | 12/2007 | Schweiher et al. |

FOREIGN PATENT DOCUMENTS

| DE | 199 33 618 A1 | 1/2001 |
| DE | 102 45 951 A1 | 4/2004 |
| DE | 10 2006 022 963 A1 | 11/2007 |
| DE | 10 2008 054 467 A1 | 6/2010 |
| EP | 0 895 908 A1 | 2/1999 |

* cited by examiner

*Primary Examiner* — David D Le
*Assistant Examiner* — Jacob S Scott
(74) *Attorney, Agent, or Firm* — Davis & Bujold, PLLC; Michael J. Bujold

(57) ABSTRACT

A parking lock device for a motor vehicle transmission which comprises a transmission housing, a locking pawl mounted by a bolt to swivel on the housing and loaded by a restoring spring, a guide plate supported on the housing, and a locking element by which, in the engaged condition, the locking pawl can be locked by being supported against the guide plate. The locking pawl is arranged on the bolt with some play and, on a narrow side thereof facing toward the guide plate, has a pawl hook with a first detent element, while the guide plate has, in a swiveling area of the pawl hook, an opening with a second detent element which interlocks with the first detent element when the parking lock is disengaged.

8 Claims, 3 Drawing Sheets

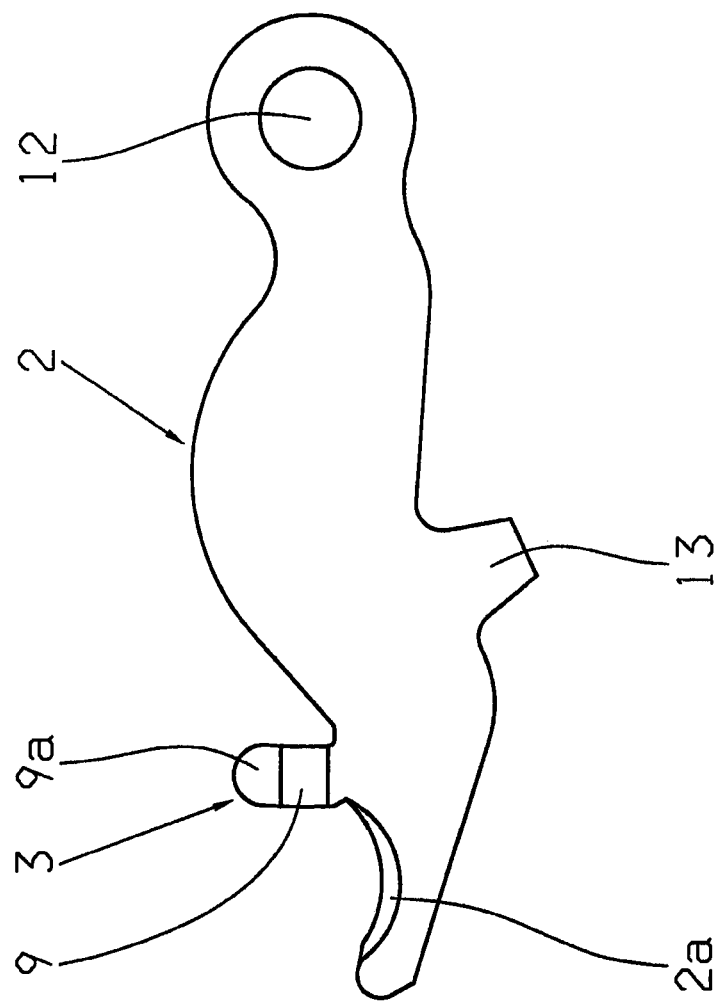

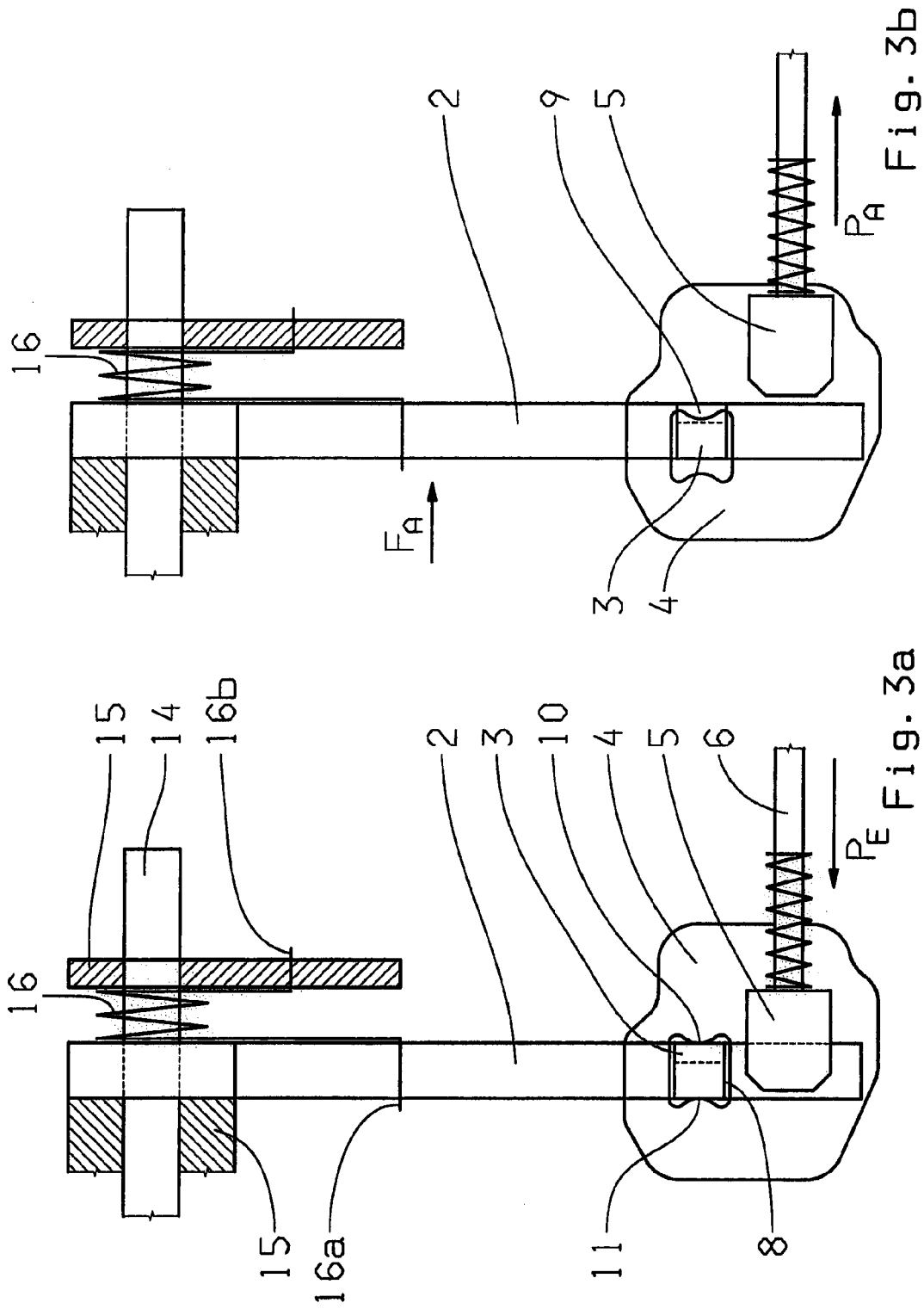

PARKING LOCK DEVICE FOR MOTOR VEHICLE

This application claims priority from German patent application Ser. no. 10 2010 000 774.9 filed January 11, 2010.

FIELD OF THE INVENTION

The invention concerns a parking lock device for a motor vehicle.

BACKGROUND OF THE INVENTION

It is known to equip motor vehicle transmissions such as automatic or dual-clutch transmissions with a parking lock, in order to prevent the vehicle from rolling away. The structure of such a parking lock is described, for example, in DE 199 33 618 A1 by the present applicant: a locking pawl is mounted on the transmission housing by means of a bolt, the so-termed parking lock bolt, and loaded by a restoring spring, for example a lever spring, in the circumferential or swiveling direction. The locking pawl comprise a pawl tooth which engages in a tooth gap on a parking lock gear arranged on the transmission output and blocks it, i.e. so that the parking lock is engaged. The known parking lock device also comprises a guide plate supported on the housing and serving as the abutment for a locking cone, which locks the locking pawl in its engaged condition. The locking cone is actuated by a connecting rod. When the locking cone is retracted the locking pawl is released and swiveled back by the restoring spring, so that the pawl tooth disengages from the parking lock gear—and the parking lock is then in its disengaged condition.

From DE 102 45 951 A1 a parking lock device has become known, which has at its free end a so-termed pawl hook which is guided in a guide slot of the guide plate.

A problem that occurs in the disengaged condition of the parking lock, for example when driving on roads in poor condition or with marked vibrations of the transmission, is that the locking pawl can become loose on the guide plate—against the force of the restoring spring—and tooth-crown contact can take place between the pawl tooth and the parking lock teeth. This can result in damage to the parking lock system.

To solve this problem various approaches have already been tried, for example as in DE 10 2006 022 963 A1, where a hydraulically actuated locking device is provided to hold the locking pawl steady in its disengaged condition.

From EP 0 895 908 A1 a parking lock device with a locking pawl is known, which in its disengaged condition is locked by an electromagnetically actuated locking bolt. Both of these previously known solutions have the disadvantage that additional components are required for the locking device, and this increases the structural complexity, the weight and the cost of the transmission.

In the older application by the present applicant with file number DE 10 2008 054 467.1 a parking lock device with a locking pawl is disclosed, which in its disengaged condition is secured with positive interlock by a moveable securing element by means of a spring element.

SUMMARY OF THE INVENTION

The purpose of the present invention is to improve further a parking lock device of the type mentioned at the start, and in particular to propose securing means for the locking pawl in its disengaged condition which are as simple and inexpensive as possible.

According to the invention, it is provided that the locking pawl is arranged on the parking lock bolt with some play, i.e. axial and/or radial play, the pawl having a pawl hook, i.e. a projection extending toward the guide plate with a first detent element, and in the guide plate, in the swiveling area of the pawl hook an opening with a second detent element is provided, behind which the first detent element engages when the parking lock is disengaged, so that the locking pawl is retained or locked. By virtue of this positive securing the locking pawl is held in its disengaged position even during juddering or vibration, and tooth-crown contact or rattling can no longer occur. According to the invention, the locking of the pawl hook onto the guide plate is brought about, on the one hand, by the tilting movement of the locking pawl relative to the parking lock bolt and, on the other hand, by an axial force of the special restoring spring. As soon as the locking cone under the locking pawl is pulled out, the special restoring spring exerts an axial force on the locking pawl which presses the pawl hook against the second detent element, where it locks into its end position. The advantage of this solution is that very few additional components and design measures are needed, so that there is no additional weight such as that associated with a locking device.

According to a preferred embodiment, the first detent element on the pawl hook is formed as a detent projection, detent shoulder or detent stud. Thus, when the parking lock is disengaged the pawl hook can first pass through the opening in the guide plate, until the detent stud or projection engages behind and locks the guide plate.

In a further preferred embodiment the second detent element on the guide plate is in the form of a detent or locking edge, which co-operates with the detent stud or detent projection. By virtue of the structure of these two detent elements securing with positive interlock is achieved.

In a further preferred embodiment the opening in the guide plate has a guiding projection arranged opposite the detent edge. When the locking pawl engages and disengages, i.e. during its swiveling movement, the pawl hook rests against this guiding projection.

According to a further preferred embodiment the restoring spring of the locking pawl also exerts an axial force on the locking pawl, i.e. directed in the longitudinal direction of the parking lock bolt, so that when the parking lock is disengaged the pawl is pressed against the detent edge. When the pawl hook has engaged this axial force is maintained as a contact pressure force, so ensuring constant interlocking security. Thus the restoring spring, designed in particular as a lever spring, has two functions, namely first it exerts a circumferential force to restore the locking pawl and secondly it exerts an axial force to tilt the locking panel or displace it axially.

In further preferred embodiments the detent edge and preferably also the guiding projection on the guide plate are in each case of convex shape. This provides a linear contact between the pawl hook and the guide plate, i.e. a definite contact, particularly since the locking pawl undergoes a slight tilting movement as the parking lock is being disengaged.

BRIEF DESCRIPTION OF THE DRAWINGS

An example embodiment of the invention is represented in the drawing and described in more detail below, so that further features and/or advantages can be seen from the description and/or the drawing, which shows:

FIG. 2: The locking pawl with its pawl hook according to the invention;

FIG. 3a: Overall view of the parking lock device according to the invention with its mounting on the housing, in the engaged condition of the parking lock; and FIG. 3b: The parking lock device in a condition with the parking lock disengaged but secured according to the invention.

DETAILED DESCRIPTION OF THE PREFERRED EMBODIMENTS

Figures 1, 1A:
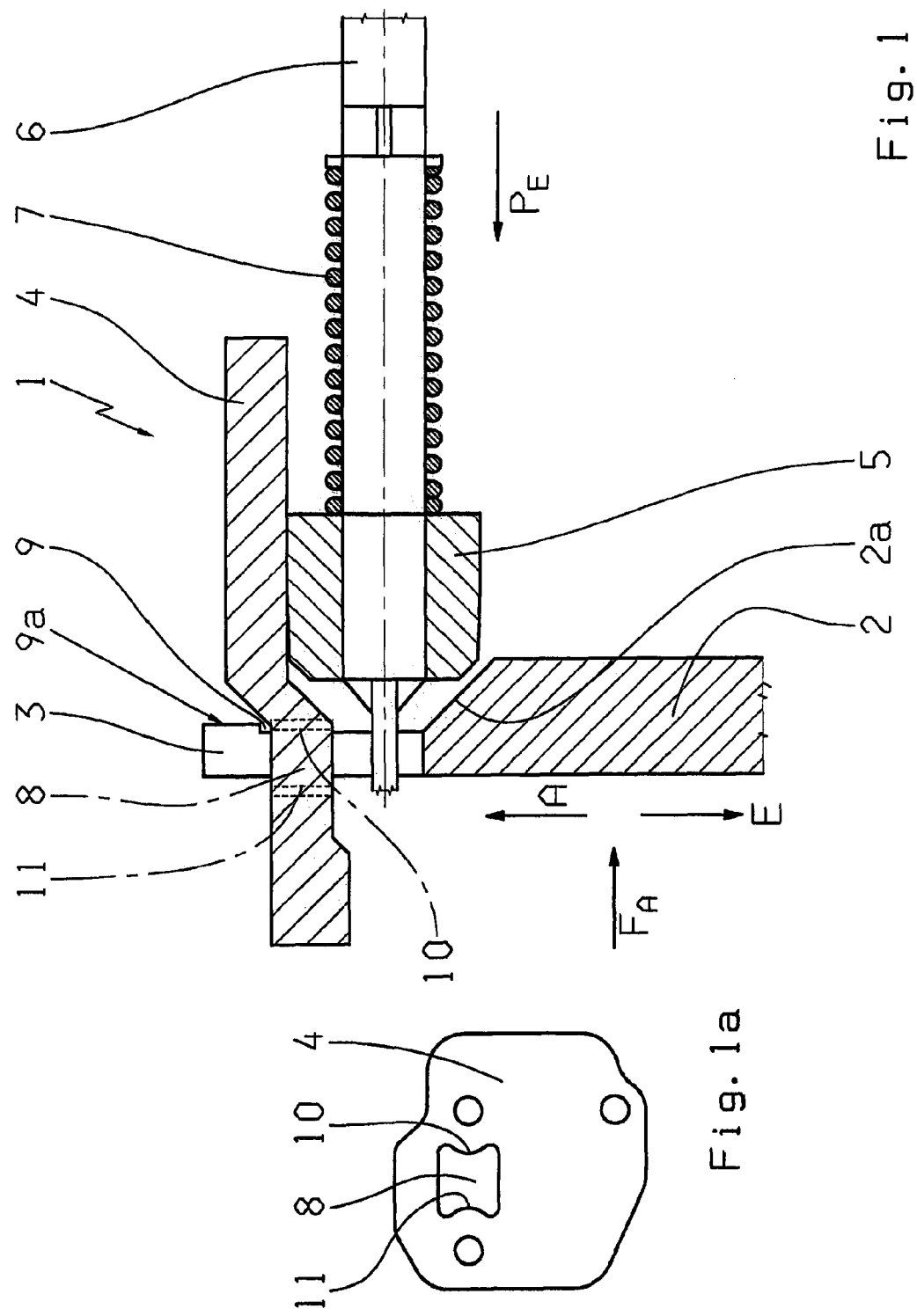
FIG. 1: Sectioned view of a parking lock device with the guide plate, locking cone and locking pawl.
FIG. 1a: Plan view of the guide plate in FIG. 1, with an opening.

FIG. 1 shows a partial sectioned view of a parking lock device 1. The parking lock device comprises a locking pawl 2 with a pawl hook 3, a guide plate 4 supported on the housing and a locking element in the form of a locking cone 5 arranged to slide on a connecting rod 6 and loaded by a compensation spring 7. The parking lock device 1 is shown in its condition with the parking lock disengaged, i.e. the locking pawl 2 is not in tooth engagement with a parking lock gear (not shown). The locking cone 5 is retracted and out of contact with the locking pawl 2. As shown clearly in FIG. 1a the guide plate 4 has an opening 8 through which the pawl hook 3 passes. At its end projecting out of the opening 8 the pawl hook 3 has a first detent element in the form of a detent projection 9 or detent stud, with an end face 9a. On the guide plate 4 in the area of the opening 8 is arranged a second detent element 10 represented in FIG. 1a as a convexly curved detent edge 10. The detent projection 9 rests against the detent edge 10 in such manner that the locking pawl 2 is locked in the direction of the arrow E (engagement direction). At the same time an axial force $F_A$, produced by a restoring spring (not shown here), acts upon the locking pawl 2. Thus, the pawl hook 3 is pressed against the detent edge 10. Opposite the detent edge 10 on the guide plate 4 is arranged a guiding projection 11, as can be seen particularly clearly in FIG. 1a. From this representation it can already be seen that the parking lock device according to the invention, with its interlocking security in the disengaged condition, has no additional components compared with the prior art. The opening 8 can be formed, for example, by stamping out from the guide plate 4, and the structure of the pawl hook 3, which is preferably formed integrally with the parking pawl 2, also involves no additional components.

When the parking lock is to be engaged, the locking cone 5 is pushed by the connecting rod 6 and by means of the compensation spring 7 in the direction of the arrow $P_E$. During this movement the locking cone 5 encounters an oblique face 2a of the locking pawl 2 and exerts a force on the locking pawl 2 directed oppositely to the axial force $F_A$, so that the pawl hook 3 disengages and releases the lock. The locking pawl 2 can then swivel in the direction of the arrow E so as to lock the parking lock gear (not shown).

FIG. 2 shows the locking pawl 2 in isolation (not drawn to scale). The same indexes as in FIG. 1 are used for the same components. The locking pawl 2 has a bolt hole 12 by means of which it is mounted on the transmission housing by a parking lock bolt (not shown here), so that it can swivel. In addition the locking pawl 2 has a pawl tooth 13 (locking tooth) which, when the parking lock is deployed, engages in a tooth gap of the parking lock gear (not shown). The pawl hook 3 is arranged on the narrow side of the locking pawl 2 opposite the pawl tooth 13 and has at its free end the end face 9a that forms the detent projection or detent shoulder 9 (first detent element).

Preferably, the locking pawl 2 is made integrally with the pawl hook 3, for example as a stamped component. The index 2a denotes an oblique face on the locking pawl 2, which the locking cone 5 encounters (see FIG. 1).

FIG. 3a shows an overall view of the parking lock device 1, seen looking down onto the guide plate 4 from above. Again, the same indexes are used for the same components. The locking pawl 2 is mounted by a parking lock bolt 14 to swivel on the transmission housing 15, and is loaded by a restoring spring 16 made as a lever spring in the swiveling direction: in this case a first end 16a of the lever spring 16 engages with the parking lock pawl 2, while a second end 16b thereof rests against the transmission housing 15.

FIG. 3a shows the parking lock in its engaged condition, i.e. the locking pawl 2 is blocked against the guide plate 4 by the locking cone 5 and so locks the parking lock gear. The pawl hook 3 projects through the opening 8 and is supported against the guiding projection 11. The arrow $P_E$ indicates the direction for engaging the parking lock.

FIG. 3b shows the parking lock device 1 in the disengaged condition, with the locking cone 5 retracted by the actuating rod 6 in the direction of the arrow $P_A$, and the locking pawl 2 swiveled by the restoring force of the lever spring 16 to its disengaged position. At the same time, the axial force $F_A$ (see FIG. 1) acts on the locking pawl 2 and tilts and/or pushes it with the pawl hook 3 and the detent stud 9 in the direction of the force $F_A$, so that the detent stud 9 engages with the detent edge 10 of the guide plate 4. The locking pawl 2 is now locked in its disengaged position, i.e. even with juddering or vibrations of the transmission the locking pawl 2 is held firm, so that contact with the parking lock gear and any possible damage to the parking lock system are reliably prevented.

For the tilting and/or axial movement of the locking pawl 2 to be able to take place from the position shown in FIG. 3a to that shown in FIG. 3b, there are two prerequisites: on the one hand there must exist between the bolt hole 12 (see FIG. 2) and the outer diameter of the parking lock bolt 14 a certain amount of radial play, i.e. so that relative to the longitudinal axis of the bolt 14 the locking pawl 2 can undergo some tilting movement away from a right-angle. Furthermore, the locking pawl 2 must be arranged on the bolt 14 with a certain amount of axial play. The other prerequisite is that besides its restoring force in the circumferential direction the lever spring 16 must be designed so that it can exert the above-mentioned axial force $F_A$ on the pawl 2, in such manner that this axial force $F_A$ is maintained during the locking in the disengaged condition.

Accordingly, the parking lock device 1 entails a minimum of additional components and modifications to an existing parking lock system.

Indexes

1 Parking lock device
2 Locking pawl
2a Oblique face
3 Pawl hook
4 Guide plate
5 Locking cone
6 Connecting rod
7 Compensation spring
8 Opening
9 First detent element/detent stud
10 Second detent element/detent edge
11 Guiding projection
12 Bolt hole
13 Pawl tooth
14 Bolt
15 Transmission housing 16 Lever spring
16a First end of the spring
16b Second end of the spring
$F_A$ Axial force
$P_A$ Movement direction of the locking cone during "disengagement"
$P_E$ Movement direction of the locking cone during "engagement"
A Movement direction of the locking pawl during disengagement
E Movement direction of the locking pawl during engagement

The invention claimed is:

1. A parking lock device for a motor vehicle transmission, the parking lock device comprising:
 a transmission housing (15),
 a locking pawl (2) is mounted on a bolt (14) so as to swivel with respect to the housing and is loaded by a restoring spring (16),
 a guide plate (4) is supported on the housing, and
 a locking element (5) blocks the locking pawl (2) against the guide plate (4) into an engaged condition in which the parking lock device is locked,
 the locking pawl (2) being arranged on the bolt (14) with play and, on a side facing toward the guide plate (4), the locking pawl (2) comprises a pawl hook (3) with a first detent element (9), and
 in a swivelling area of the pawl hook (3), the guide plate (4) has an opening (8) with a second detent element (10) which interlocks with the first detent element (9) of the locking pawl when the parking lock device is disengaged so as to secure the locking pawl in a disengaged condition.

2. The parking lock device according to claim 1, wherein the first detent element is formed as one of a detent projection and a detent stud (9) on the pawl hook (3).

3. The parking lock device according to claim 1, wherein the second detent element is formed as a detent edge (10) on the guide plate (4).

4. The parking lock device according to claim 3, wherein the second detent element or the detent edge (10) on the guide plate (4) has a convex shape.

5. The parking lock device according to claim 1, wherein the pawl hook (3) has an abutment end surface (9a) at an end of the first detent element (9).

6. A parking lock device for a motor vehicle transmission, the parking lock device comprising:
 a transmission housing (15);
 a locking pawl (2) that is mounted on a bolt (14) so as to swivel with respect to the housing and is loaded by a restoring spring (16);
 a guide plate (4) that is supported on the housing;
 a locking element (5) that blocks the locking pawl (2) against the guide plate (4) into an engaged condition in which the parking lock device is locked;
 the locking pawl (2) being arranged on the bolt (14) with play and, on a side facing toward the guide plate (4), the locking pawl (2) comprises a pawl hook (3) with a first detent element (9);
 in a swivelling area of the pawl hook (3), the guide plate (4) has an opening (8) with a second detent element (10) which interlocks with the first detent element (9) of the locking pawl when the parking lock device is disengaged so as to secure the locking pawl in a disengaged condition;
 the second detent element is formed as a detent edge on the guide plate (4); and
 the opening (8) in the guide plate (4) has a guiding projection (11) which is positioned opposite one of the second detent element and the detent edge (10).

7. The parking lock device according to claim 6, wherein the guiding projection (11) on the guide plate (4) has a convex shape.

8. A parking lock device for a motor vehicle transmission, the parking lock device comprising:
 a transmission housing (15);
 a locking pawl (2) that is mounted on a bolt (14) so as to swivel with respect to the housing and is loaded by a restoring spring (16);
 a guide plate (4) that is supported on the housing;
 a locking element (5) that blocks the locking pawl (2) against the guide plate (4) into an engaged condition in which the parking lock device is locked;
 the locking pawl (2) being arranged on the bolt (14) with play and, on a side facing toward the guide plate (4), the locking pawl (2) comprises a pawl hook (3) with a first detent element (9);
 in a swivelling area of the pawl hook (3), the guide plate (4) has an opening (8) with a second detent element (10) which interlocks with the first detent element (9) of the locking pawl when the parking lock device is disengaged so as to secure the locking pawl in a disengaged condition; and
 the restoring spring (16) acts upon the locking pawl (2) with a force ($F_A$) extending in an axial direction.

* * * * *